United States Patent

Kawasaki

[11] 4,106,087
[45] Aug. 8, 1978

[54] POWER-SUPPLY DEVICE FOR WORKING MACHINE SUCH AS A SPARK-EROSION MACHINE

[76] Inventor: Tomonori Kawasaki, 4-3 Momoyama-cho, Dairi, Moji-ku, Kitakyushu-shi, Fukuoka-ken, Japan

[21] Appl. No.: 738,253

[22] Filed: Nov. 3, 1976

[30] Foreign Application Priority Data

Nov. 5, 1975 [JP] Japan .............................. 50-133443

[51] Int. Cl.² ...................... H02M 7/08; H02M 7/155
[52] U.S. Cl. ................................ 363/70; 219/130.32; 363/128
[58] Field of Search .................. 219/131 WR; 321/11, 321/47, 27 R; 363/54, 67, 70, 128

[56] References Cited

U.S. PATENT DOCUMENTS

| | | | |
|---|---|---|---|
| 2,763,771 | 9/1956 | Bichsel | 219/131 WR |
| 2,777,973 | 1/1957 | Steele et al. | 219/131 R X |
| 3,339,107 | 8/1967 | Aldenhoff | 219/131 R X |
| 3,346,799 | 10/1967 | Aldenhoff | 219/131 R X |
| 3,356,928 | 12/1967 | Parrish | 219/131 R X |
| 3,528,100 | 9/1970 | Budy | 219/131 R |
| 3,777,113 | 12/1973 | Arikawa et al. | 219/131 R X |
| 3,824,441 | 7/1974 | Heyman et al. | 321/11 X |
| 4,009,431 | 2/1977 | Johnson | 321/27 R X |

*Primary Examiner*—William M. Shoop
*Attorney, Agent, or Firm*—Frank J. Jordan

[57] ABSTRACT

A power-supply device for a working machine such as a spark-erosion machine, arc welding machine or the like substantially eliminates the break-down or misoperation of thyristers used in the device and wherein the device includes a circuit which comprises a power transformer, a thyrister rectifying circuit, a diode rectifying circuit, and a trigger circuit for triggering the thyrister of the thyrister rectifying circuit.

5 Claims, 7 Drawing Figures

POWER-SUPPLY DEVICE FOR WORKING MACHINE SUCH AS A SPARK-EROSION MACHINE

BACKGROUND OF THE INVENTION

This invention relates to a direct-current power-supply device for spark erosion machines, arc welding machines or the like.

In general, the circuit of the direct-current power-supply device of the present invention comprises a power transformer for obtaining a large amount of current at a secondary circuit thereof, a thyrister as an element for controlling an output current, and a trigger circuit for controlling the trigger angle of the thyrister.

The circuits of conventional devices have the disadvantage that thyristers used in the circuit frequently break down due to a sudden or rapid change of load, a short circuiting of output-current terminals, or a sharply increased transient current. For example, in an arc welding machine, when the impedance between one electrode and another electrode which is connected to a workpiece rapidly changes, the thyrister has easily broken down.

For the purpose of attempting to resolve the above disadvantages and problems, a reactor has heretofore been connected to the output-current terminal so as to suppress or alleviate the sharp rate of increase of the output-current. However, the employment of a reactor is not sufficient to diminish the rupture of thyristers.

Accordingly, it is an object of the present invention to provide a power-supply device for various kinds of working machines such as spark erosion machines and the like which overcomes the aforementioned disadvantages of prior art devices wherein the circuit of the device of the present invention is constructed and is provided with means employed in the circuit so as to prevent the rupture of the thyrister employed in the circuit and accordingly, working machines are provided with stable output-current.

DETAILED DESCRIPTION OF THE PREFERRED EMBODIMENTS

This invention relates to a power-supply device for a working machine, especially the circuit thereof, which substantially comprises a power transformer, a thyrister rectifying circuit which is connected to a secondary circuit of the power transformer, a trigger circuit which is connected to the gate of the thyrister of the thyrister rectifying circuit, and a diode rectifying circuit which is connected to an auxiliary secondary circuit of the power transformer. In the above construction, the direct-current output terminal of the thyrister rectifying circuit is connected with the direct-current output terminal of the diode rectifying circuit in the direction of the same electromotive force, and a protective condenser is provided between the gate and cathode of the thyrister and the main secondary circuit and the auxiliary secondary circuit respectively have additional number of normal and inverse turns besides the desired number of turns for obtaining the desired output power. Furthermore, the short-circuit current of the auxiliary secondary circuit is predetermined to be smaller than that of the main secondary circuit and the no-load voltage of the auxiliary secondary circuit is predetermined to be either equal to or higher than that of the main secondary circuit.

The device or circuit thereof of this invention is described in greater detail with respect to each part or component of the circuit wherein like numerals are used to indicate like parts throughout the description.

Figure 1:
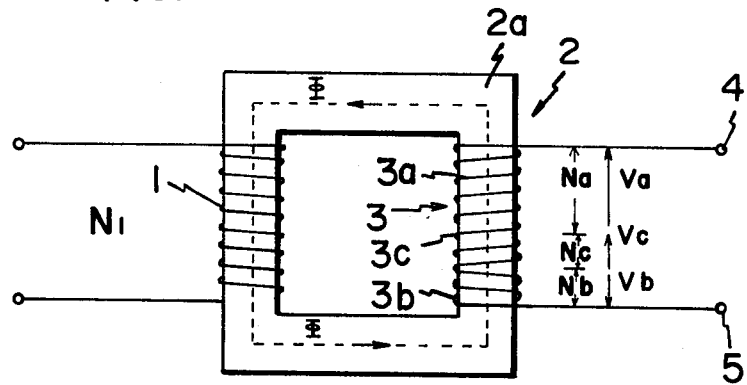
FIG. 1 is a schematic view of a transformer employed in the device of the present invention.

FIG. 1 shows a power-supply transformer 2 employed in the device of the invention wherein numeral 1 indicates a primary circuit or winding, numeral 2a indicates an iron core, numeral 3 indicates a main secondary circuit and numerals 4 and 5 are output terminals. In this transformer, main secondary circuit 3 is provided with a winding 3a of normal turns (Na) for obtaining the desired secondary output current and is further provided with a winding 3c of normal turns (Nc) and a winding 3b of inverse turns (Nb). Since the number of turns Nb of winding 3b is equal to the number of turns (Nc) of winding 3c, the electromotive force of the main secondary circuit 3 can be represented by the following formula:

$$Va + Vc - Vb = Va,$$

where
$Va$ = electromotive force of winding 3a;
$Vb$ = electromotive force of winding 3b;
$Vc$ = electromotive force of winding 3c.

The reason for constructing the secondary circuit or winding 3 in the above way is that although windings 3b and 3c do not contribute toward generating an electromotive force since they offset each other, they work as an inductance for alleviating the rapid change of current which arises when a rapid load change occurs between output terminals 4 and 5 or when a shortcircuit occurs in the circuit.

Figure 2:
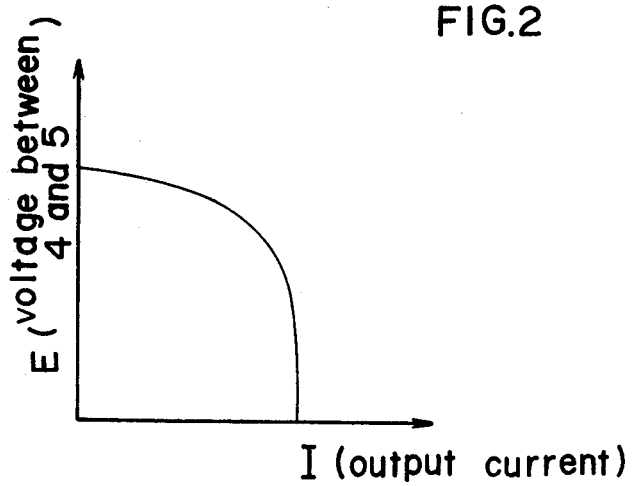
FIG. 2 is a graph showing the relationship between the current and voltage of the above power transformer.

Another reason for building up the secondary circuit in the above way is described as follows. When a half-wave rectifier is provided between output terminals 4 and 5 and then the main secondary circuit 3 is connected with the load, the half-wave direct current runs through circuit 3 and the magnetomotive force is induced in core 2 by the main secondary current 3. However, the magnetic flux is generated in core 2 by the winding 3b in a direction opposed to the direction $\phi$ and this phenomenon works such that it prevents or suppresses the change of magnetic flux that passes through iron core 2 and furthermore, this suppressing effect becomes more apparent corresponding to the rise in the rate of current change. In other words, the above-constructed transformer works like a saturable transformer and indicates a favorable drooping characteristic which is shown in FIG. 2 whereby the desired stable output current which is suitable for operation of a spark-erosion machine or an arc welding machine can be obtained.

Figure 3:
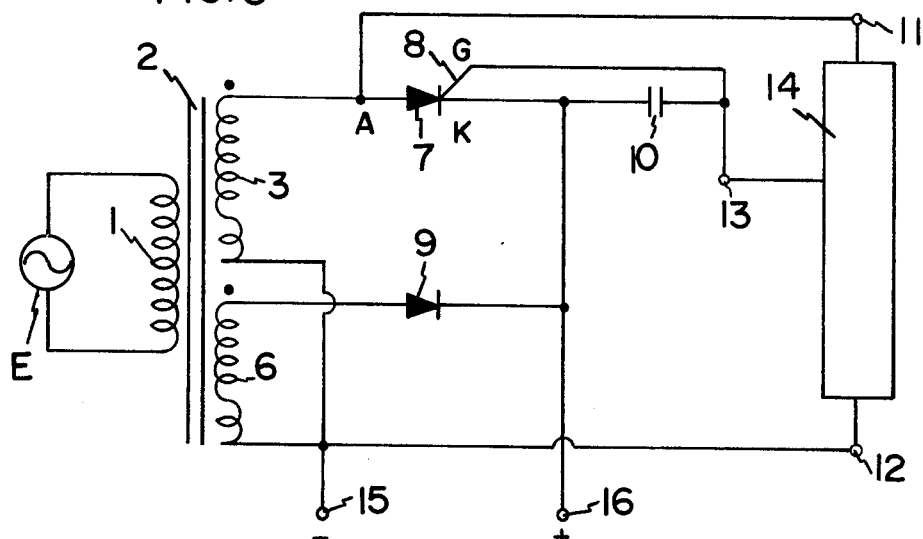
FIG. 3 is a wiring diagram showing the construction of the power-supply device of the present invention.

FIG. 3 shows one embodiment of this invention which is directed to a single-phase circuit wherein a primary circuit 1 which is wound on one side of an iron core 2a of a power transformer 2 is connected to a single-phase power source E, and a thyrister 7 which rectifies the output current and controls the output voltage is connected to a main secondary circuit 3 which is wound on the core 2 in the manner previously described.

At the secondary circuit of power transformer 2, an auxiliary secondary circuit 6 is provided besides the main secondary circuit 3 wherein auxiliary secondary circuit 6 also includes inverse turns in the same manner as main secondary circuit 3.

A diode 9 is connected to the auxiliary secondary circuit 6 in the same direction of electromotive force as thyrister 7, thus making a common positive terminal 16 while other terminals of main secondary circuit 3 and of auxiliary secondary circuit 6 are connected together so as to make a common negative terminal 15.

The relationship between main secondary circuit 3 and auxiliary secondary circuit 6 must be determined such that auxiliary secondary circuit 6 has the smaller amount of short circuit current than main secondary circuit 3 while the no-load voltage of auxiliary secondary circuit 6 is predetermined to be equal to or higher than that of main secondary circuit 3.

In FIG. 3, numeral 14 indicates a trigger circuit for thyrister 7, numerals 11 and 12 indicate input terminals supplying power to trigger circuit 14, and numeral 13 indicates an output terminal for triggering thyrister 7. Numeral 10 indicates a protecting condenser which is provided between the gate and cathode of the thyrister 7.

Figure 4:
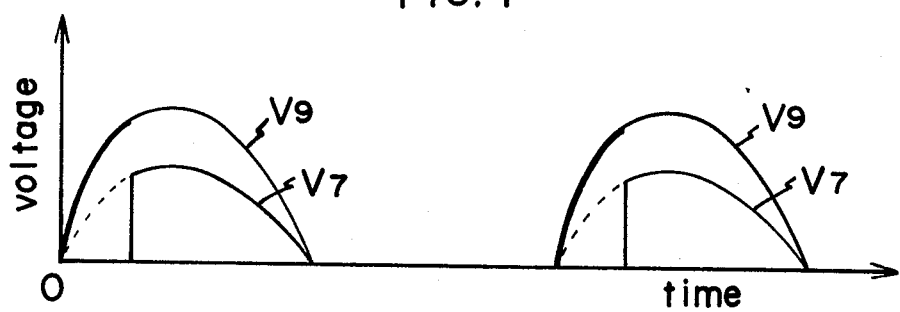
FIG. 4 shows wave form charts of the voltage between terminals 15 and 16.

In this invention, since the circuit is constructed in the above way, the voltage $V_t$ between terminals 15 and 16 becomes equal to either the higher voltage chosen from the voltage $V_7$ rectified by thyrister 7 or the voltage $V_9$ rectified by diode 9 so that when there is no load (refer to FIG. 4), voltage $V_9$ takes the higher value than $V_7$ while when the load impedance is lowered (this phenomenon takes place when the arc welding machine or spark-erosion machine starts its operation), the load current is increased so that the currents which are respectively induced in the main secondary circuit 3 and auxiliary secondary circuit 6 are increased.

Since the relationship between current and voltage of the main secondary circuit and auxiliary secondary circuit is predetermined in the above way, when the load current is increased substantially, most of the load current is supplied from the main secondary circuit 3.

In the above condition where the load impedance is lowered, the shock or impulse caused by the above rapid change in load is transmitted to auxiliary secondary circuit 6 and subsequently is added to main secondary circuit 3 so that thyrister 7 which is disposed within main secondary circuit 3 can be prevented from impulse current coupled with the previously mentioned effect of the wiring of inverse turns.

The protection of thyrister 7 against momentary current which occurs between the anode and cathode of thyrister 7 has been described heretofore.

The thyrister 7 is also protected from the breaking-off caused by currents having high peak values such as a rush current which occurs between the gate and cathode of the thyrister 7 at the time of triggering or other noise currents by connecting protective condenser 10 to the thyrister 7, such that when the current of high peak value is supplied to the gate of thyrister 7 by some causes, the current which has the phase thereof lead by condenser 10 relative to original wave form is supplied to the cathode of thyrister 7 so that the current between the gate and cathode of thyrister 7 takes the lower value than the breakoff value whereby thyrister 7 is protected.

Figure 5:
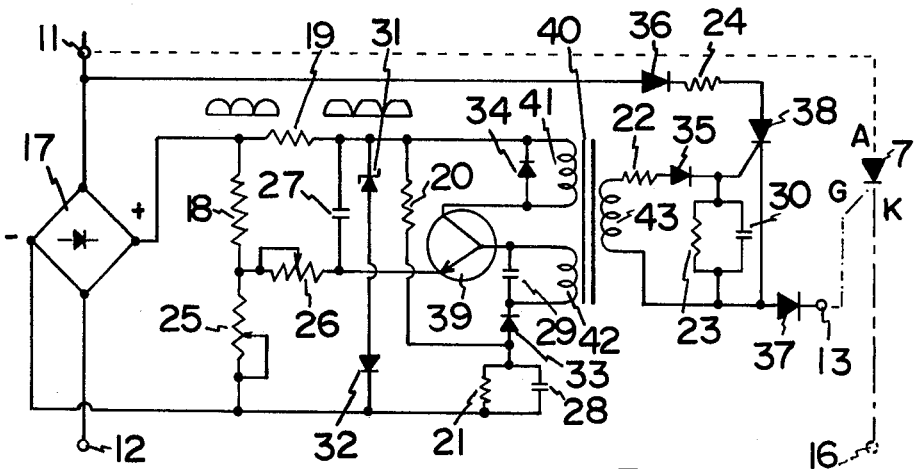
FIG. 5 is a circuit diagram showing one embodiment of the trigger circuit for triggering the thyrister.

FIG. 5 shows one embodiment of the trigger circuit wherein numerals 11, 12 and 13 correspond to the same numerals in FIG. 3.

In FIG. 5, numeral 17 indicates a full-wave rectifier, numerals 18, 19, 20, 21, 22 and 23 indicate resistors. Numerals 25 and 26 indicate variable resistors, numerals 27, 28, 29 and 30 indicate condensers, numeral 31 indicates a zener diode, numeral 32 indicates a temperature-compensating diode, numerals 33, 34, 35, 36 and 37 indicate normal diodes, numeral 38 indicates a thyrister of small capacity, numeral 39 indicates a transistor, numeral 40 indicates a pulse transformer, numerals 41 and 42 indicate primary circuits thereof and numeral 43 indicates a secondary circuit thereof.

In this trigger circuit, the thyrister 7 is triggered by a loop composed of diode 36, current regulating resistor 24, thyrister 38 and diode 37 and furthermore thyrister 38 is triggered by a blocking oscillator by way of pulse transformer 40 wherein transistor 39 constitutes the main component of the blocking oscillator as an amplifying element.

The reason for constructing the trigger circuit in the above way is that this circuit is used or employed as the power source circuit of a spark-erosion machine or arc welding machine. Since the anode current and anode voltage of thyrister 7 sharply and rapidly change when the circuit is used in the above machines and accordingly, the condition of the gate current which triggers thyrister 7 is easily affected by the above anode current and anode voltage, the circuit must be constructed in the above way to stabilize the gate current.

Namely the trigger circuit is constructed such that another thyrister 38 is employed for triggering thyrister 7 while a blocking oscillator is constructed by condenser 27, the coil 41 forming the primary circuit of pulse transformer 40, transistor 39, feedback resistor 20 and coil 42. The frequency of this oscillator synchronizes with the frequency of power source E. To be more exact, since the rectifier 17 which rectifies the power-source frequency is a full-wave rectifier, the frequency of the oscillator synchronizes with the frequency twice as high as the power-source frequency.

The output current of the above-mentioned blocking oscillator is transmitted to secondary circuit 43 by way of pulse transformer 40 and triggers thyrister 38, whereby thyrister 7 is subsequently triggered.

The adjustment of the trigger angle is effected by variable resistors 25 and 26 wherein resister 25 adjusts the emitter potential of transistor 39 while resistor 26 adjust the emitter current of transistor 39 so that the trigger angle of the thyrister is adjusted, whereby the output current is adjusted.

Figure 6:
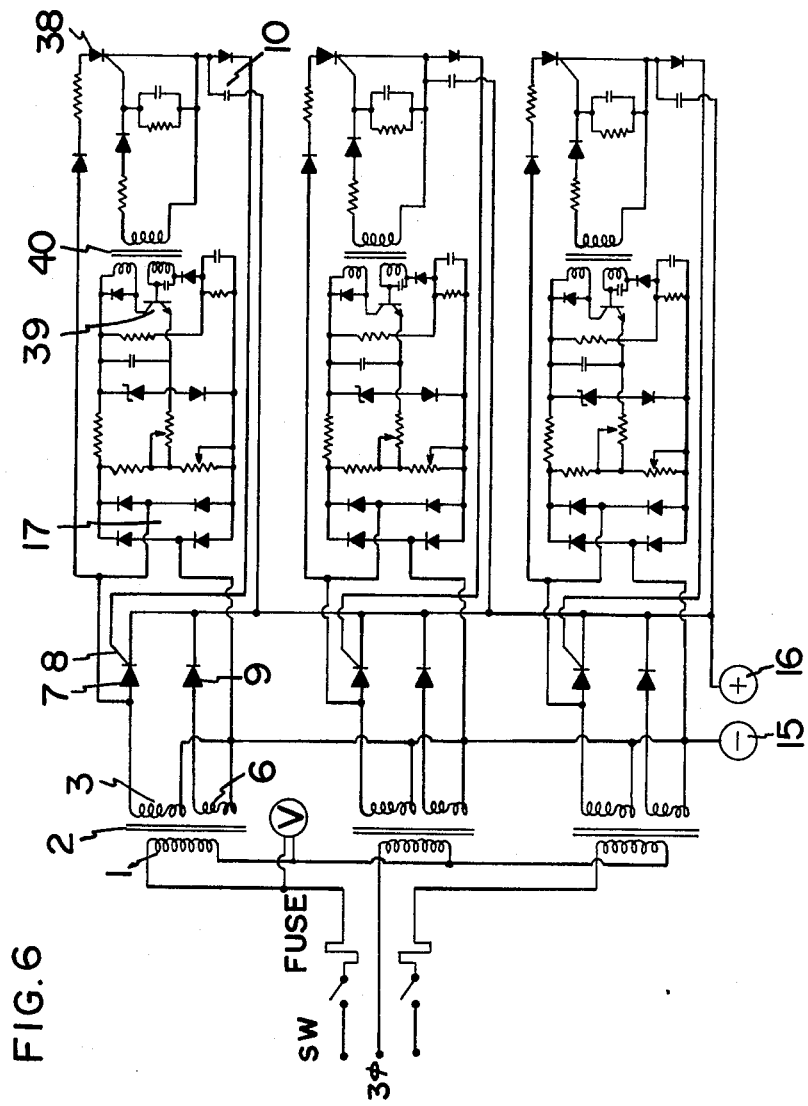
FIG. 6 is a circuit diagram showing the overall circuit of another embodiment of a power-supply device which employs a three-phase alternate current power source.

FIG. 6 shows the overall circuit of another embodiment of this invention which employs three-phase alternate power source.

Figure 7:
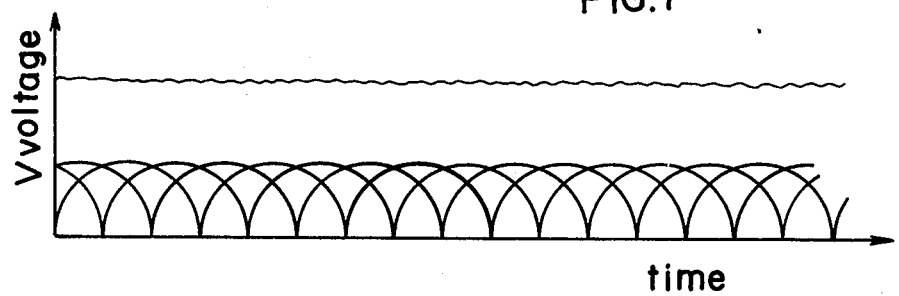
FIG. 7 is a wave form chart showing the output voltage of power-supply device of FIG. 6.

This embodiment, as can be observed from FIG. 7, provides the non-breaking smooth and stable direct-current output voltage when there is no load.

The construction of the circuit of each phase is equal to that of the single phase circuit.

As has been described heretofore, according to this invention, a thyrister which is provided to control the operating output current of a spark-erosion machine or an arc welding machine can be prevented from break down or misoperation, whereby it no longer becomes necessary to replace thyristers so frequently as compared to conventional power-supply devices and accordingly, the durability and reliability of the power-supply device is enhanced.

What is claimed is:

1. Power-supply device for a working machine such as a spark-erosion machine, arc welding machine or the like comprising:
   (1) a power transformer having a main secondary circuit and an auxiliary secondary circuit, said main secondary circuit and said auxiliary secondary circuit being respectively provided with additional normal and inverse turns in addition to the desired number of normal turns which generates desired output current,
   (2) a thyrister rectifying circuit having a first thyrister, said thyrister rectifying circuit being connected to said main secondary circuit,
   (3) a diode rectifying circuit connected to said auxiliary secondary circuit parallel to said thyrister rectifying circuit, and
   (4) a first trigger circuit for triggering said first thyrister of said thyrister rectifying circuit.

2. Power-supply device according to claim 1, wherein the short-circuit current of said auxiliary secondary circuit is predetermined to be smaller than that of said main secondary circuit and the no-load voltage of said auxiliary secondary circuit is predetermined to be equal or higher than that of said main secondary circuit.

3. Power-supply device according to claim 1, further comprising a second trigger circuit which comprises a second thyrister, said first thyristor being triggered by said second trigger circuit, said second thyrister being triggered by a blocking oscillator by way of a pulse transformer.

4. Power-supply device according to claim 1, wherein a protecting condenser is provided between the cathode and gate of said first thyrister.

5. Power supply device according to claim 3, wherein said pulse transformer comprises coil means forming a primary pulse transformer circuit, said blocking oscillator comprising the last said coil means, said blocking oscillator further comprising a transistor and a feedback resistor operatively connected to one another.

* * * * *